(12) United States Patent
Wang et al.

(10) Patent No.: US 10,595,363 B2
(45) Date of Patent: Mar. 17, 2020

(54) AUTONOMOUS TOPOLOGY MANAGEMENT FOR WIRELESS RADIO USER EQUIPMENT

(71) Applicant: AT&T Intellectual Property I, L.P., Atlanta, GA (US)

(72) Inventors: Xiaoyi Wang, Austin, TX (US);
Thomas Novlan, Austin, TX (US);
Andrew Thornburg, Austin, TX (US);
Milap Majmundar, Austin, TX (US);
Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/977,513

(22) Filed: May 11, 2018

(65) Prior Publication Data

US 2019/0350046 A1 Nov. 14, 2019

(51) Int. Cl.
*H04W 84/20* (2009.01)
*H04L 12/759* (2013.01)
*H04W 4/40* (2018.01)
*H04W 76/14* (2018.01)

(52) U.S. Cl.
CPC ........... *H04W 84/20* (2013.01); *H04L 45/028* (2013.01); *H04W 4/40* (2018.02); *H04W 76/14* (2018.02)

(58) Field of Classification Search
CPC ..... H04W 84/18; H04W 84/00; H04W 84/20; H04L 41/30
USPC ........................................................ 370/329
See application file for complete search history.

(56) References Cited

U.S. PATENT DOCUMENTS

| 7,336,638 | B2 | 2/2008 | Cheng et al. |
| 8,478,262 | B2 | 7/2013 | Sun et al. |
| 8,811,950 | B2 | 8/2014 | Li et al. |
| 9,420,631 | B2 | 8/2016 | Wentink et al. |
| 9,485,772 | B2 | 11/2016 | Tiger |
| 2008/0235778 | A1 | 9/2008 | Fratti et al. |
| 2011/0082939 | A1 | 4/2011 | Montemurro et al. |
| 2013/0045678 | A1* | 2/2013 | Lee .................. H04W 4/08 455/39 |
| 2014/0099950 | A1 | 4/2014 | Mildh et al. |
| 2015/0163300 | A1* | 6/2015 | Kumar ............ H04L 67/1046 709/205 |

FOREIGN PATENT DOCUMENTS

CN 107070729 A * 8/2017 ............ H04L 41/30

* cited by examiner

*Primary Examiner* — Jeffrey M Rutkowski
*Assistant Examiner* — Sudesh M Patidar
(74) *Attorney, Agent, or Firm* — Amin, Turocy & Watson, LLP

(57) ABSTRACT

The described technology is generally directed towards an autonomous topology management scheme in a wireless communications network that establishes a hierarchical structure from a peer-to-peer network without assistance from the wireless network. A group of user equipments negotiate with each other to elect a local manager that acts as a base station by which other user equipments of the group can access network resources. Described is an example voting scheme by which the negotiation process elects the local manager for a term.

20 Claims, 11 Drawing Sheets

AUTONOMOUS TOPOLOGY MANAGEMENT FOR WIRELESS RADIO USER EQUIPMENT

TECHNICAL FIELD

The subject application is related to wireless communication systems, and, for example, to a vehicle-to-everything (V2X) communications.

BACKGROUND

In LTE wireless communication systems, vehicle-to-everything (V2X) generally utilizes the Sidelink interface, alternatively referred to as PC5, to enable V2X communications, including V2V (vehicle-to-vehicle) communications, V2I (vehicle-to-infrastructure) communications, V2P (vehicle-to-pedestrian) communications and V2N (vehicle-to-network) communications. The PC5 interface is built based on a mesh architecture of peer-to-peer device communication. LTE V2X also supports Uu interface (the radio interface between the mobile device and the radio access network) enhancement to assist the PC5 communications.

Existing (e.g., PC5-based) interfaces assume a mesh architecture in which every node is a peer to each other. This approach does not rely on any network infrastructure. However, spectrum efficiency cannot be very high because of the peer-to-peer structure. Another drawback of this mesh architecture is that it is not compatible with infrastructure-based cellular networks that utilize a hierarchical architecture. As a result, a separate spectrum needs to be obtained to deploy a V2X service based on a peer-to-peer mesh network architecture, which is very costly.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
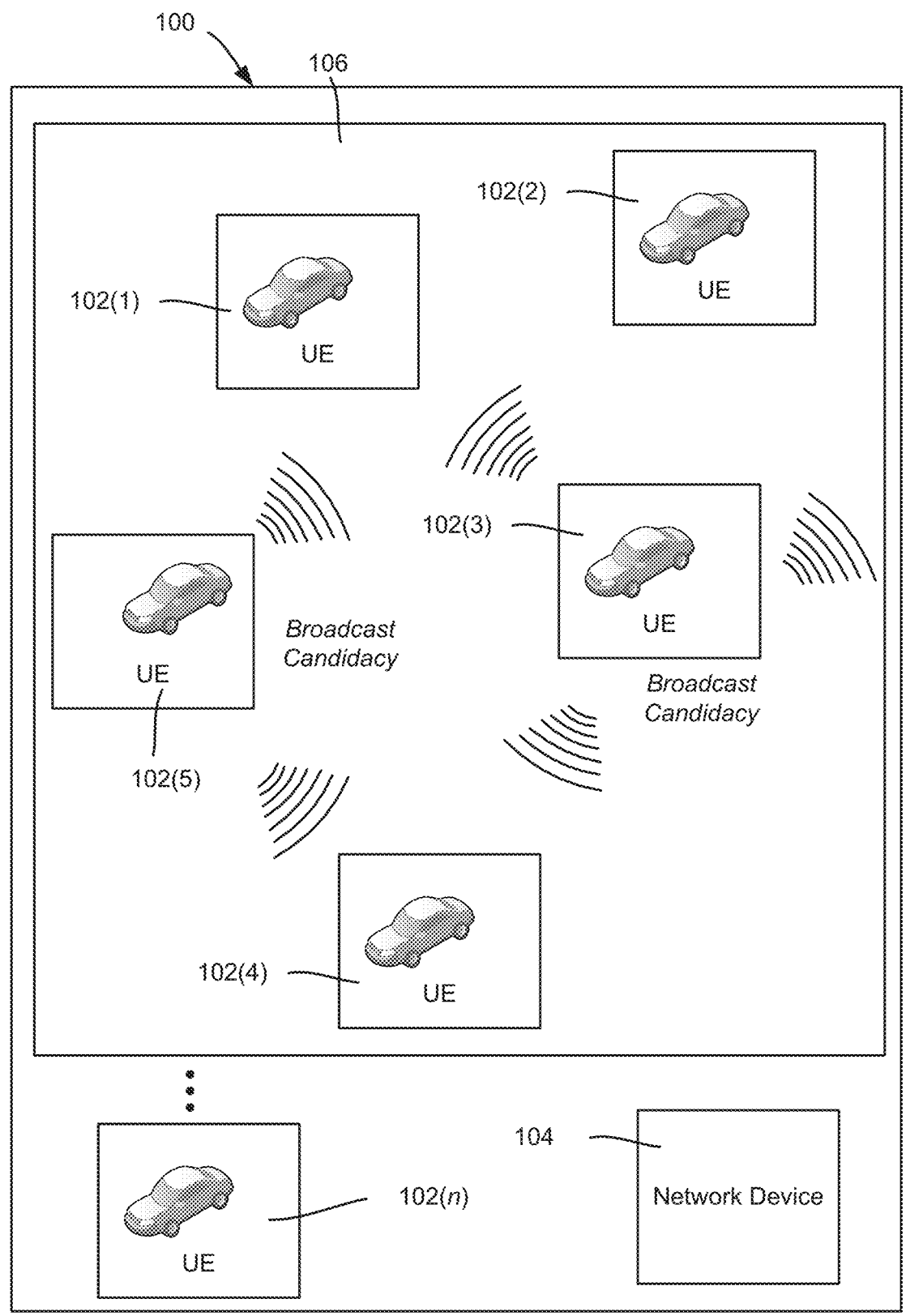
FIG. 1 illustrates an example wireless communication system in which various user equipments (UEs) within a group communicate to broadcast candidacies for local manager of the group, in accordance with various aspects and implementations of the subject disclosure.

One or more aspects of the technology described herein are generally directed towards an autonomous topology management scheme that operates to establish a hierarchical structure that includes a local manager within a user equipment network that is part of a wireless network. In general, "autonomous" refers to the ability of a peer-to-peer network to establish the hierarchical structure independent of needing any assistance from the wireless network. In one or more implementations, a group of V2X traffic user equipments (including vehicle and/or pedestrian terminals and the like) form a group, and negotiate with each other to elect a local manager of the group, wherein the local manager, for example, can communicate information with a wireless network device on behalf the user equipments of the group.

In one or more aspects, a voting scheme is described, which in one or more implementations elects a single local manage for the group. In general, if a user equipment of the group is capable of being a local manager based on one or more various criteria, the user equipment nominates itself to be the local manager, via a broadcast self-candidacy notification. If not capable, the user equipment selects (e.g., based on signal strength) and votes for another nominated candidate, e.g. by sending voting data comprising an acknowledgment to that neighbor candidate's candidacy notification, and sending a negative acknowledgment to any other candidate. If two or more user equipments in the group are candidates, the voting data (acknowledgment(s) and negative acknowledgment(s)) from other user equipment(s) of the group generally determine the local manager.

It should be understood that any of the examples and terms used herein are non-limiting. For instance, the examples are based on New Radio (NR, sometimes referred to as 5G) communications between a user equipment exemplified as a smartphone or the like and network device; however virtually any communications devices may benefit from the technology described herein, and/or their use in different spectrums may likewise benefit. Notwithstanding, these are non-limiting examples, and any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are NodeB, base station (BS), multi-standard radio (MSR) node such as MSR BS, gNodeB, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception.

Note that the solutions outlined equally applies for Multi RAB (radio bearers) on some carriers (that is data plus speech is simultaneously scheduled).

FIG. 1 illustrates a wireless communication system 100 comprising one or more user equipments 102(1)-102(n) and a network 104 (e.g., representing any network device or set of devices). In order to form a group, in one or more aspects, a user equipment e.g., 102(1) broadcasts a discovery signal to one or more neighboring user equipments, e.g., 102(2)-102(5), so that the user equipment 102(1) can be discovered. At generally the same time, the user equipment 102(1) and the other neighboring user equipments 102(2)-102(5) are monitoring for such discovery signals. Note that the other neighboring user equipments 102(2)-102(5) may or may not have discovered each other yet, although one or more may have discovered one or more others beforehand, and indeed, a prior group may already exist.

Once discovered, a user equipment e.g., 102(1) and at least one other user equipment may form a group or join an existing group, which forms a new group. In one or more implementations, for example, the PC5 interface (Sidelink) defined in LTE has standardized discovery signals and a suitable corresponding procedure for broadcasting and discovery, and may be leveraged to form the group. Notwithstanding, any suitable broadcast/discovery technology may be used.

Thus, in the example of FIG. 1, a group 106 is formed, comprising the user equipments 102(2)-102(5). In FIG. 1, the user equipment 102(n) is not part of the group, such as because it was not in range of the discovery signals, did not want to participate, and so on. As can be readily appreciated, although the example group 106 comprises the user equipments 102(2)-102(5), any practical number (at least two) of user equipments can form a group.

Unlike conventional peer-to-peer structures, the group 106 as described herein is formed with the intention of having one user equipment operate as a local manager, and communicate with the network device 104 on behalf of the group, e.g., to relay communications to and from the network device 104. To this end, as further represented in FIG. 1, aspects of the technology described herein include broadcasting candidacy notifications, in which any user equipment can seek to become a local manager of the group 106. In the example of FIG. 1, the user equipment 102(3) and the user equipment 102(5) are broadcasting candidacy notifications to the group.

In general, to determine candidacy qualifications, any user equipment monitors the synchronization signal from any existing local manager, or from the network device 104. If the RSRP (Reference Signal Received Power) that is received is less than a threshold value, the user equipment may volunteer itself to be local manager, although this is likely to be dependent on one or more other criteria, such as battery capabilities, traffic type, hardware capability, or service capability (e.g., environmental sensors fusion capability or platoon navigation).

If a user equipment decides to become a candidate for the local manager, the user equipment notifies the other, neighbor user equipments in the group about its candidacy for local manager. Note that the user equipment autonomously selects the radio resource for broadcasting the self-candidacy notification, which is received by other user equipments in the group as a "neighbor-candidacy notification."

As an alternative to an explicit "self-candidacy nomination," a message may be sent from a user equipment to nominate another, neighbor user equipment to be a local manager. For example, in a situation in which a user equipment cannot itself act as a local manager on its own (e.g. due to limited capabilities), the user can request (by sending an indirect "neighbor-candidacy notification") for a nearby vehicle (or other user equipment) to become a candidate for local manager, even if the other user equipment is already connected to a different local manager. It is feasible for a user equipment to nominate more than one other user equipment to become candidates.

Regardless of the source of a received neighbor-candidacy notification, the user equipment has a time duration to decide how to respond. In one or more implementations the time duration is an absolute time, such as where the synchronization is achieved by GNSS (Global Navigation Satellite System). This supports a principle in one or more implementations, which is that any user equipment can connect to only one local manager. Within the time duration, a user equipment may ignore any neighbor-candidacy notification, or broadcast its decision on each, e.g., send voting data (e.g., an acknowledgement or negative acknowledgement) in response to the neighbor-candidacy notification.

Figure 2:
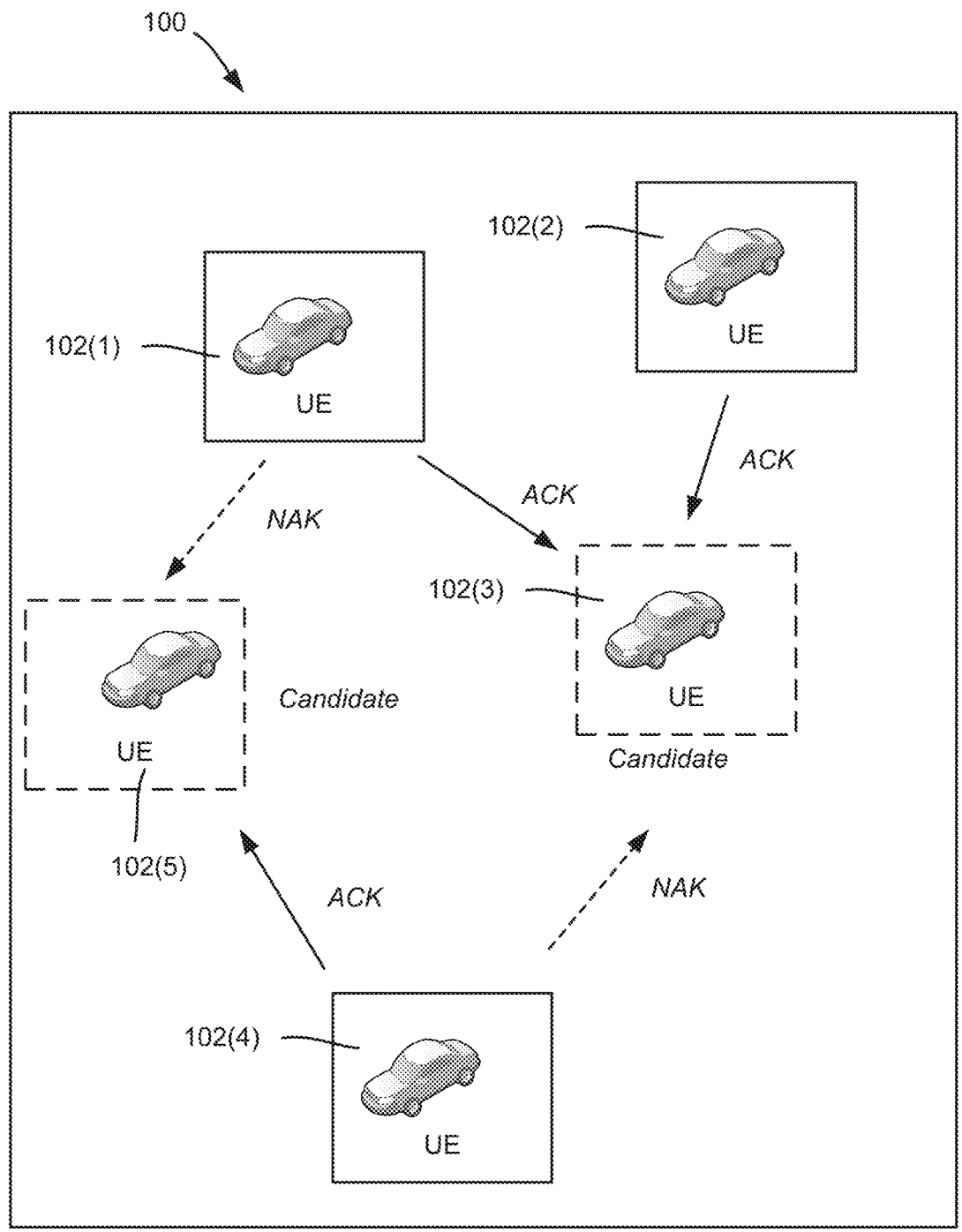
FIG. 2 illustrates an example wireless communication system in which various user equipments (UEs) within a group communicate to vote for a local manager of the group, in accordance with various aspects and implementations of the subject disclosure.

FIG. 2 represents voting data being sent by in response to the neighbor-candidacy notifications received as a result of the candidacy notifications broadcast in FIG. 1, which made the user equipment 102(3) a candidate for local manager and made the user equipment 102(5) another candidate for local manager. The user equipment 102(1) votes for (sends an acknowledgement identifying) the user equipment 102(3), and votes against (sends a negative acknowledgement identifying) the user equipment 102(5). The user equipment 102(4) votes for (sends an acknowledgement identifying) the user equipment 102(5), and votes against (sends a negative acknowledgement identifying) the user equipment 102(3). The user equipment 102(2) votes for (sends an acknowledgement identifying) the user equipment 102(3), and does not respond to the candidacy notification from the user equipment 102(5), such as because it chose not to, or did not receive the broadcast candidacy notification.

Various rules/criteria evaluation can be used to make a voting decision. Note that the following rules/criteria are only non-limiting examples for one possible voting scheme, and that only some, all, or other/more additional rules/criteria can be used.

For example, the decision whether to ignore can be based on the receiving signal strength of the candidacy notification. If the candidacy notification signal strength is too low, then a negative acknowledgement is sent.

Further, a user equipment can estimate the relative velocity between the candidate and itself (e.g., through Doppler shift estimation). When the relative velocity is larger than a threshold, the user equipment can ignore the candidacy notification (although in an alternative implementation, a negative acknowledgement can be sent).

If a user equipment is already connected to a local manager, then the user equipment can compare the received signal strength from new candidate for local manager. If the new candidate local manager's RSRP is stronger than the existing local manager, (possibly with some margin), then the user equipment sends a negative acknowledgement, with a time indicator on the valid term period of the current local manager, to the new candidate local manager, so that the new candidate local manager can know when the current local manager's term expires. Otherwise, the user equipment sends a negative acknowledgement to the new candidate.

If the user equipment receives multiple neighbor-candidacy notifications, the user equipment can compare the RSRP of each candidate, and only send an acknowledgement to the candidate with the strongest RSRP (and negative acknowledgements to the rest of the candidates). If the user equipment received a candidacy notification (within a time window) after the user equipment had sent acknowledgement to an earlier candidacy notification from another candidate, the user equipment sends a negative acknowledgement to the later candidacy notification.

In another alternative, when sending an acknowledgement/negative acknowledgement vote to a candidate local manager, the user equipment may additionally send an indication of other candidate local managers from which the user equipment has received candidacy notifications, as well as the most recently reported acknowledgement/negative acknowledgement status or total number of "votes" reported to other candidates. This can help distribute voting data knowledge throughout the group, such as when a user equipment cannot communicate with every member of the group. Such knowledge can be used as a tie-breaker/conflict resolution; e.g., when no one user equipment receives enough votes to become a local manager. Example tie-breakers can be to split the group, have a random or pseudo-random selection, have a step-up/back-off selection procedure (e.g., based on relative capabilities) and so on.

With respect to a user equipment that wants to become the local manager, after sending out its self-candidacy notification, the user equipment monitors the voting data (acknowledgement(s)/negative acknowledgement(s)) received from the neighbor user equipments for a period of time. If the ratio of acknowledgement over negative acknowledgement is higher than a threshold, the user equipment is elected as new candidate manager for one term (term is defined as a period of time). Otherwise, the user equipment continues to behave as regular user equipment (e.g., the user equipment may connect to an elected local manager), and refrains from sending another candidacy notification for a period of time.

In another alternative, if a candidate receives a local manager nomination request, or indication from a regular user equipment that the candidate is a unique local manager candidate, the candidate may choose to become a local manager even if the received acknowledgement/negative acknowledgement ratio is below the threshold configured limit, to avoid stranding regular user equipments without any local manager connectivity. As can be readily appreciated, this can split the group if another local manager has been elected.

Figure 3:
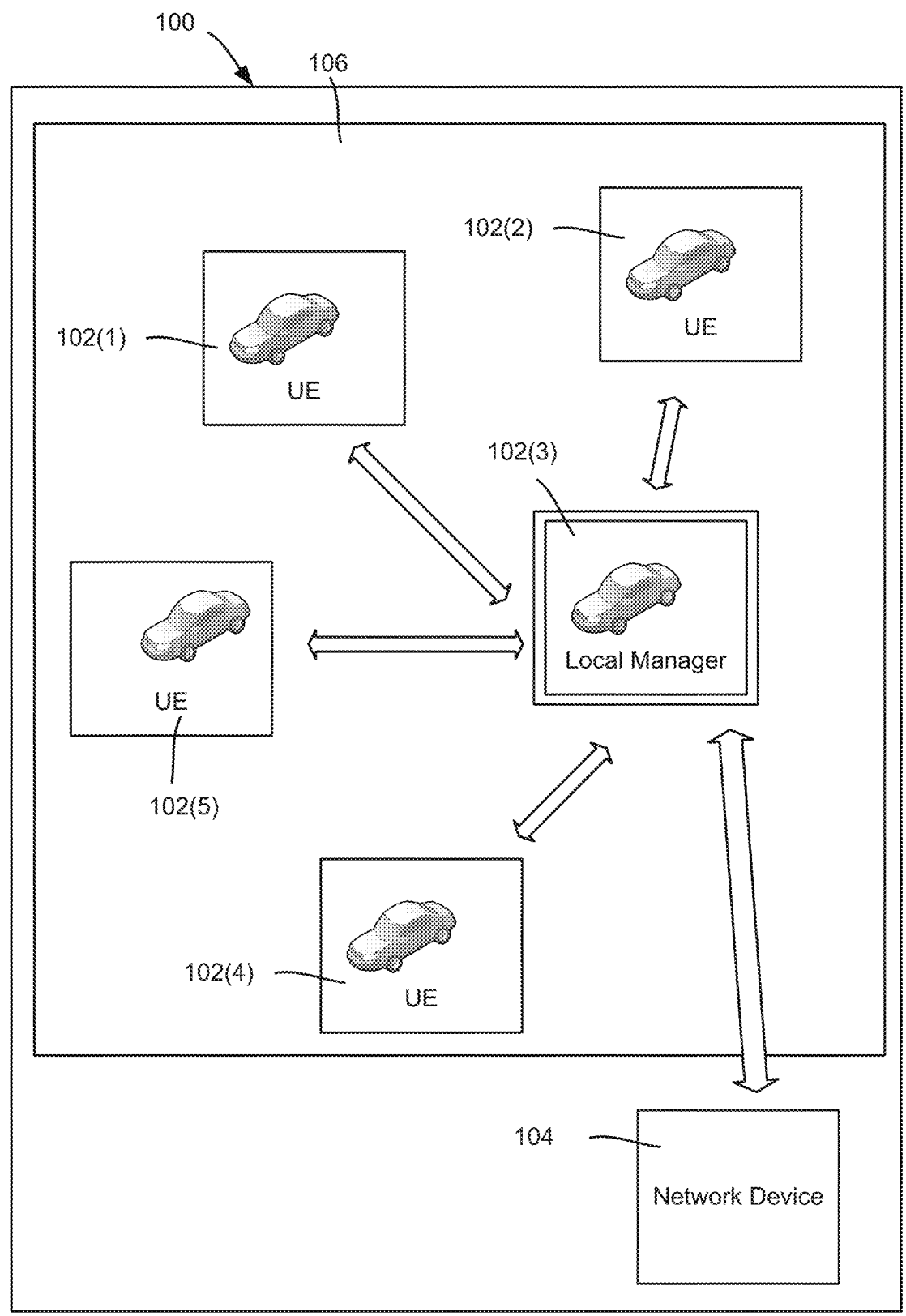
FIG. 3 illustrates an example wireless communication system in which an elected local manager of a group of user equipments (UEs) communicates with a network node, in accordance with various aspects and implementations of the subject disclosure.

In the example of FIG. 3, the group 106 has elected the user equipment 102(3) as the local manager, based on the voting data represented in the example of FIG. 2. Once elected, in general the local manager 102(3) operates as a base-station including, but not limited to, transmitting periodic synchronization signals to surrounding/nearby neighboring user equipments, monitoring RACH (random access channel) signals from user equipments for access, and so on. For a connected user equipment, the local manager 102(3) schedules radio resources for the user equipment to transmit uplink data or receive unicast downlink data, and for all connected user equipment, schedules radio resources for broadcasting information.

After the term expires, the local manager can broadcast its self-candidacy notification again, (subject to still meeting current capabilities/current state versus self-nomination decision criteria). The connected user equipments are able to receive the new candidacy notification and re-vote (send acknowledgements/negative acknowledgements) to the new candidacy notification. Other user equipment, e.g., not in the previous group, may also receive this new candidacy notification and vote with an acknowledgement/negative acknowledgement.

Depending on the votes and the voting scheme, e.g., the ratio of acknowledgements/negative acknowledgements, the previous term-expired local manager may go back to regular user equipment or continue serve as local manager. Additional metrics such as RRM/CSI/CLI measurements may be used to determine whether a local manager should continue in that role, based on interference to other groups or coverage limitations, and so on.

Figure 4:
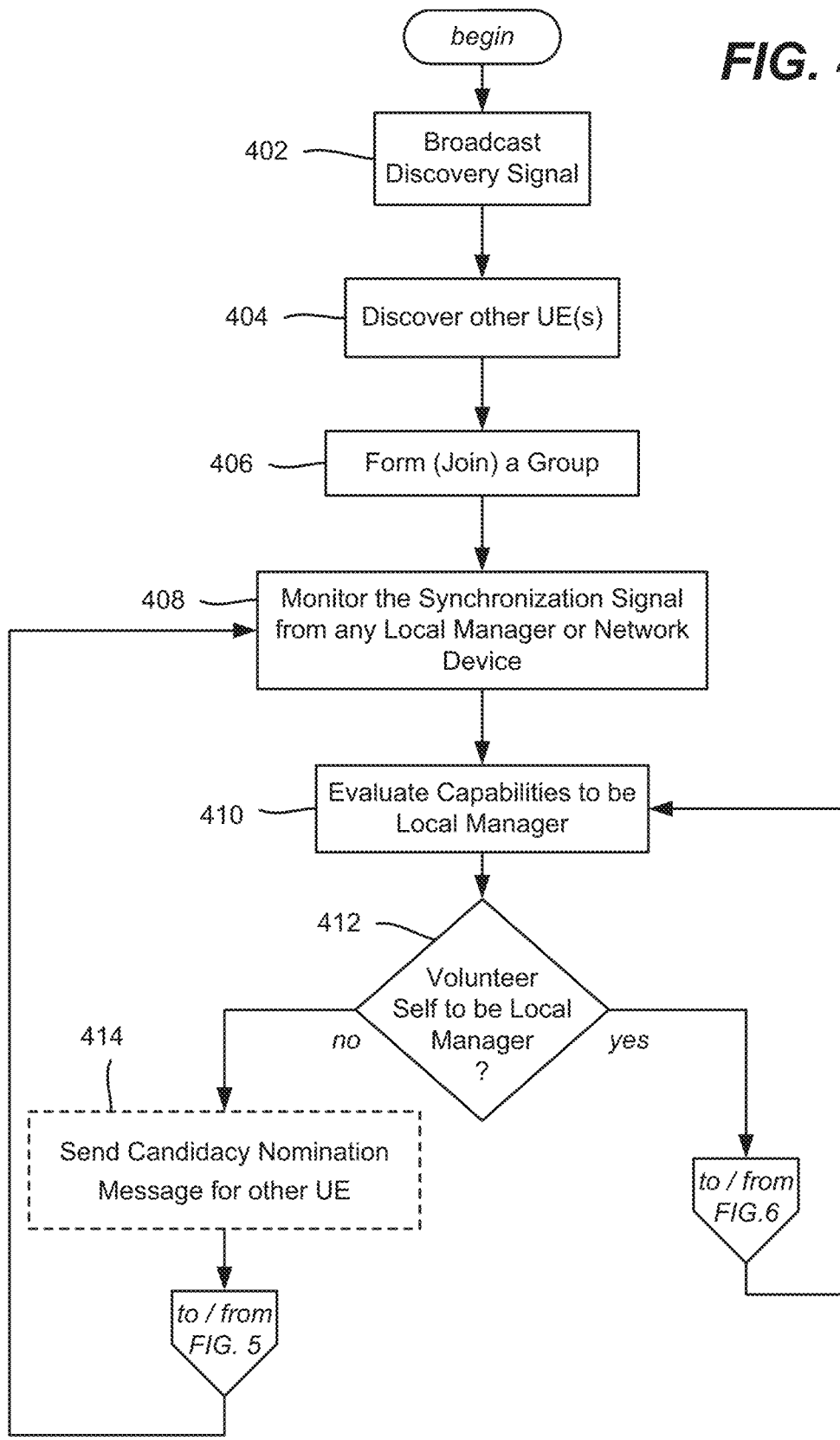
FIGS. 4-6 comprise an example flow diagram of operations of a user equipment in a group, including operations with respect to group-autonomous local manager election, in accordance with various aspects and implementations of the subject disclosure.
Figure 5:
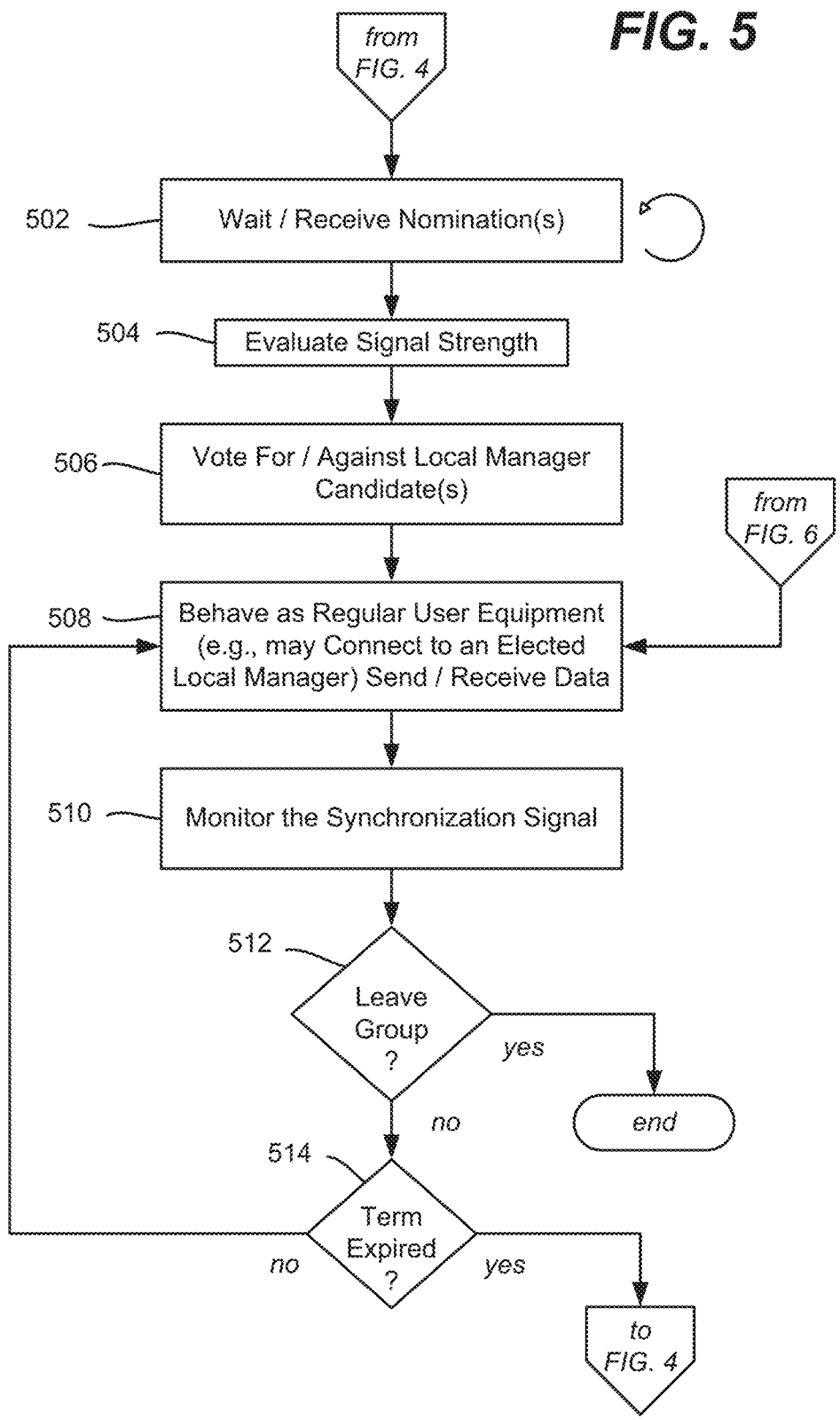
Figure 6:
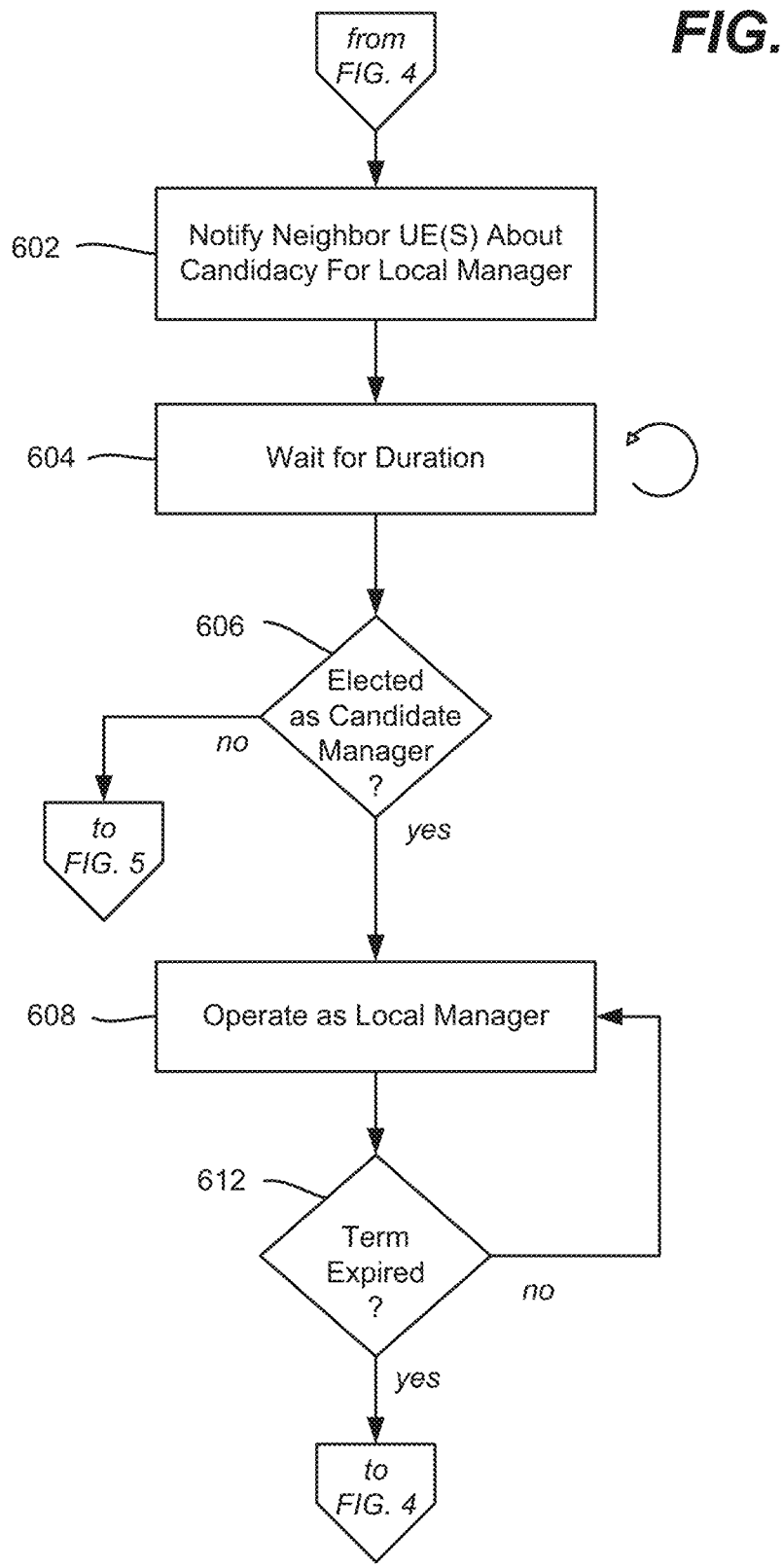

To summarize, FIGS. 4-6 comprise a flow diagram showing some example operations that a user equipment 102 may perform with respect to determining a local manager. Operation 402 represents a user equipment device broadcasting a discovery signal. Operation 404 represents a user equipment device discovering one or more other user equipments; note that if none are discovered, the discovery process ends and can be re-tried.

Operation 406 represents a user equipment device forming a group, e.g., a first time group, or a new group formed by joining an existing group. Operation 408 represents monitoring the synchronization signal from any local manager (if a group previously existed) or the network device, as described above.

As also described above, operation 410 represents the user equipment evaluating its own capabilities with respect to its current state versus one or more criteria to determine whether the user equipment is to nominate itself as a candidate for local manager. If not, operation 412 branches to FIG. 5, operation 502 to in general vote and then behave as a regular user equipment; if so, operation 412 branches to operation 602 of FIG. 6. Note that if operating as a regular user equipment, one alternative (operation 414) is to nominate another user equipment as a candidate for local manager.

If not volunteering as a candidate for local manager, operation 502 of FIG. 5 represents waiting for and receiving neighbor candidacy nomination notifications. When the waiting time is done, operation 504 represents evaluating the signal strength of the candidates and selecting the local manager candidate with the best signal strength; note that other selection criteria may be used, e.g., as described above, an existing local manager may be given some margin by which a challenger needs to exceed the existing local manager's signal strength.

Operation 506 represents voting, which as described above can be sending an acknowledgment for the selected candidate and a negative acknowledgment for each other candidate. There may be only one candidate.

Operation 508 represents the user equipment behaving as a regular user equipment, which may include initially connecting to an elected local manager, as well as sending and receiving data communications. The user equipment may continue to monitor the synchronization signal (operation 510), e.g., to decide whether to remain in the group (operation 512). If in the group as managed by the local manager, operation 514 continues the regular user equipment operation by returning to operation 508 until the term expires and the example operations of FIG. 4, from operation 408, are again performed.

If instead the user equipment volunteers as a candidate for local manager, operation 602 of FIG. 6 is performed, which represents notifying (broadcasting to) neighbor user equipments in the group about the user equipment's candidacy for local manager. Operation 604 represents waiting for the appropriate duration for the neighbor user equipments to vote. Note that in one voting scheme, the self-candidacy notification can be considered a vote for the user equipment that nominated itself.

When the waiting time is done, operation 606 represents evaluating whether the voting data indicates that the user equipment has won the vote and is the local manager. If not, the user equipment returns to FIG. 5, operation 508, to behave as a regular user equipment as described above.

If operation 606 determines that the voting data indicates that the user equipment has won the vote and is the local manager, operation 608 represents operating as the local manager, e.g., acting as a base station, including relaying communications to the network device, broadcasting information to other user equipments, and so on, or in other words, act in a relay mode or a local breakout mode, depending on traffic type information. As part of operating as a local manager, the local manager can communicate with the network node to establish the list of user equipment assigned to this local manager, receive the assigned radio resource pool for scheduling the user equipment, schedule the assigned user equipment and so on.

In this example, the local manager operation continues until the term expires (operation 612), at which time the process returns to FIG. 4, operation 410 to (possibly) volunteer again to be the local manager. Note that it is feasible for a local manager to end the term early, such as if conditions change, e.g., as based on evaluation of a metric, in which event the manager can resign and a new local manager can be elected. A local manager also can stop functioning, upon which a new local manager can be elected.

Figure 7:
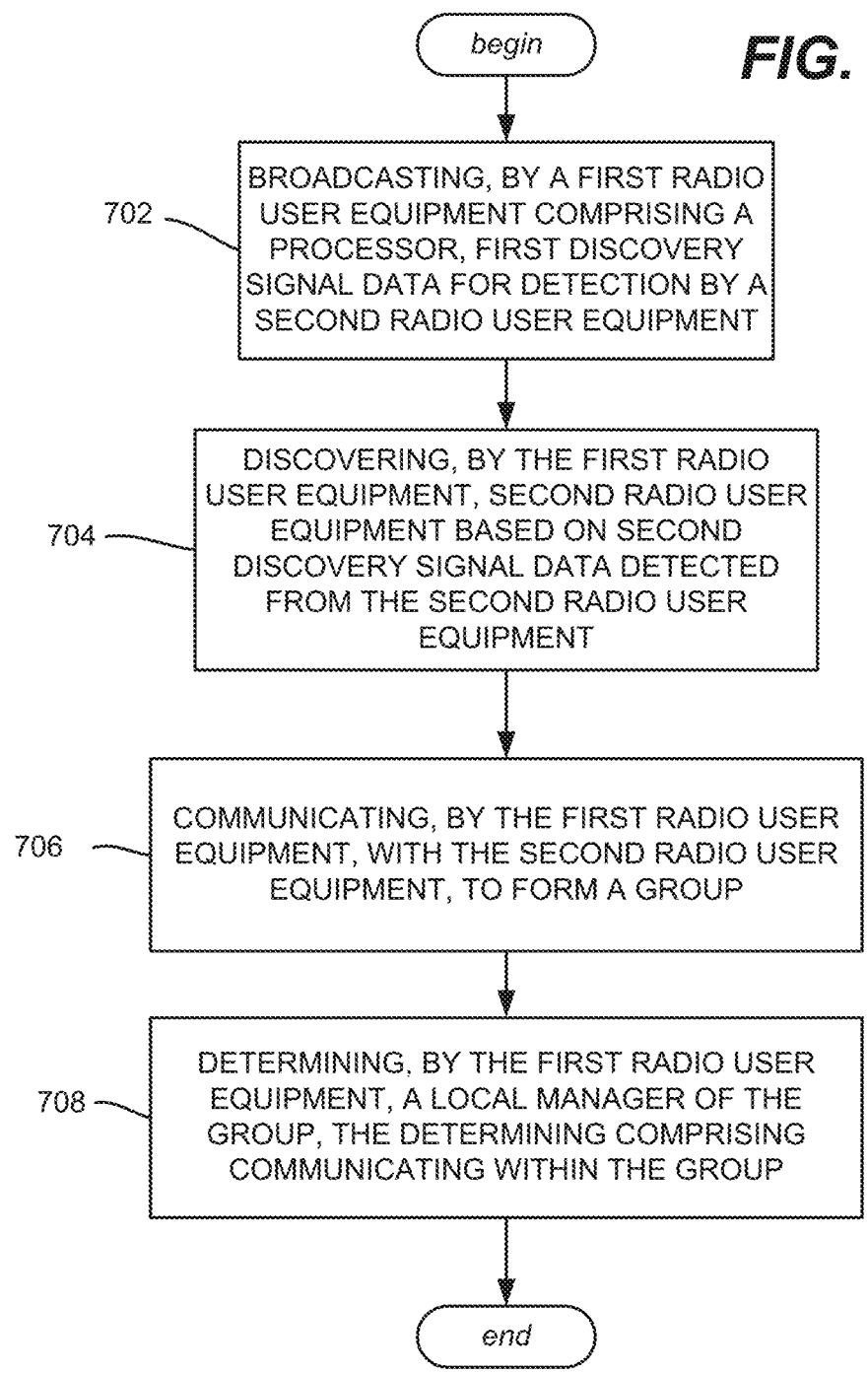
FIG. 7 illustrates an example flow diagram of user equipment operations with respect to determining a local manager of a group, in accordance with various aspects and implementations of the subject disclosure.

FIG. 7 represents general, example operations of a user equipment 102. Operation 702 represents broadcasting, by a first radio user equipment comprising a processor, first discovery signal data for detection by a second radio user equipment. Operation 704 represents discovering, by the first radio user equipment, second radio user equipment based on second discovery signal data detected from the second radio user equipment. Operation 706 represents communicating, by the first radio user equipment, with the second radio user equipment, to form a group. Operation 708 represents determining, by the first radio user equipment, a local manager of the group, the determining comprising communicating within the group.

Determining the local manager of the group can comprise receiving a neighbor-candidacy notification that nominates a neighboring radio user equipment of the group as a candidate to be the local manager of the group, and sending, within a time duration, voting data in response to the receiving the neighbor-candidacy notification. Sending the voting data can comprise sending an acknowledgement or a negative acknowledgement in response to the neighbor-candidacy notification.

Determining the local manager of the group can comprise receiving at least two neighbor-candidacy notifications that nominate at least two corresponding radio user equipments as candidates to be the local manager of the group, choosing a selected candidate of the candidates of the at least two corresponding radio user equipments based on signal strength information corresponding to the at least two neighbor-candidacy notifications, and sending, within a time duration, voting data identifying the selected candidate in response to the receiving the at least two neighbor-candidacy notifications. Sending the voting data can comprise sending, in response to the receiving the at least two neighbor-candidacy notifications, an acknowledgement identifying the selected candidate, and respective negative acknowledgements with respect to other neighbor-candidacy notifications relating to ones of the at least two corresponding radio user equipments other than the selected candidate.

Communicating within the group can comprise broadcasting a self-candidacy notification that volunteers the first radio user equipment as a candidate to be the local manager of the group. Determining the local manager of the group further can comprise monitoring, within a time duration, voting data received from the second radio user equipment in response to the broadcasting the self-candidacy notification, determining, based on the voting data, that the group elects the first radio user equipment to be the local manager of the group, and operating the first radio user equipment as the local manager, comprising relaying information received from the group to a radio network device.

Determining the local manager of the group further can comprise evaluating voting data communicated within the group, determining, based on the voting data, that the group elects the first radio user equipment to be the local manager of the group, operating the first radio user equipment as the local manager for a term, comprising relaying information received from the group to a radio network device, and upon expiration of the term, broadcasting a self-candidacy notification that volunteers the first radio user equipment as a candidate to remain as the local manager of the group.

Determining the local manager of the group can comprise broadcasting a neighbor-candidacy notification that requests that a third radio user equipment, which is not the local manager of the group, become a candidate to be the local manager of the group.

Determining the local manager of the group can comprise receiving a neighbor-candidacy notification request that requests that the first radio user equipment become a candidate to be the local manager of the group, evaluating capability data representative of a capability of the first radio user equipment to operate the first radio user equipment as the local manager, and in response to the evaluating, sending decision data representative of whether the neighbor-candidacy notification request has been accepted.

Figure 8:
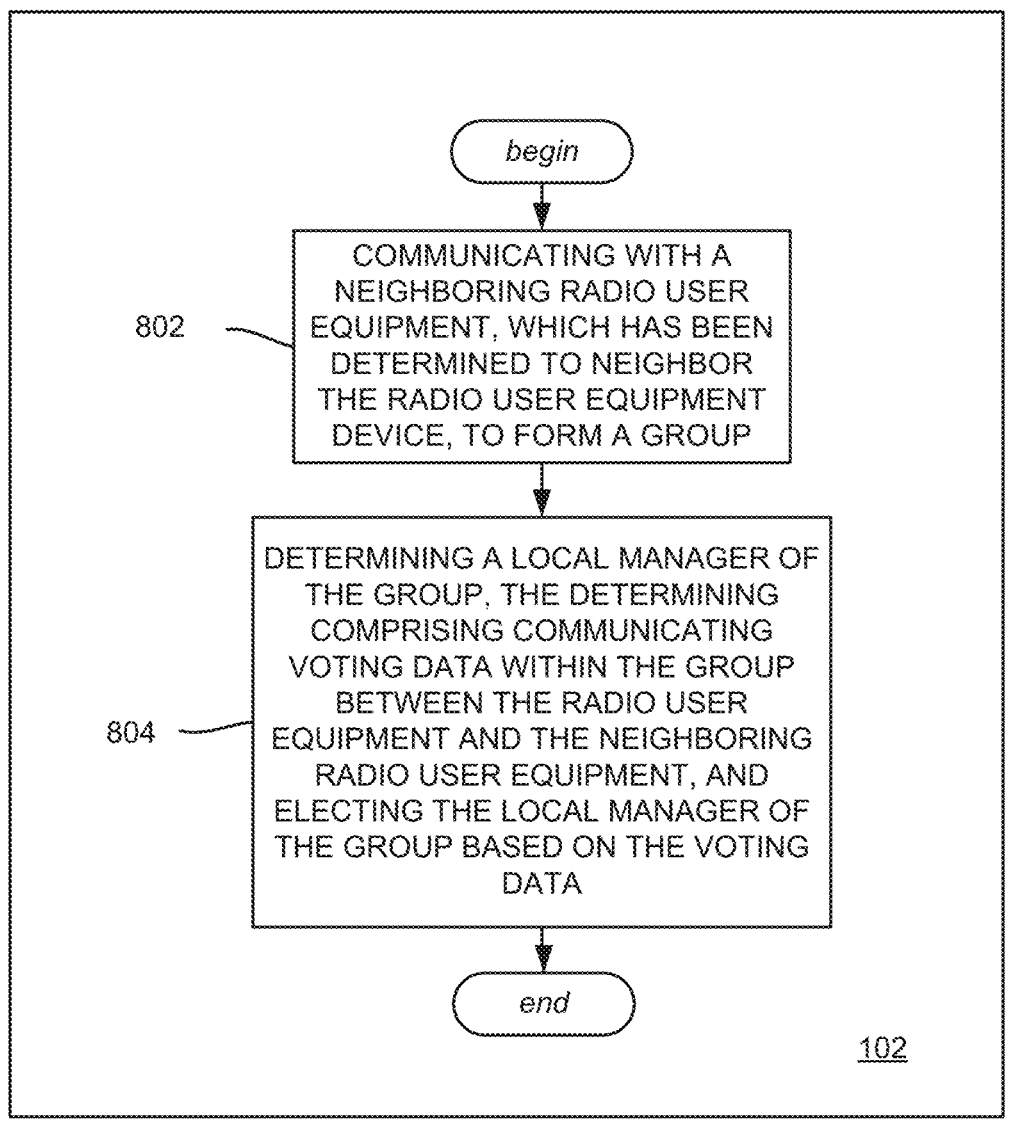
FIG. 8 illustrates a block diagram of a user equipment's example operations, comprising operations for determining a local manager of a group, in accordance with various aspects and implementations of the subject disclosure.
Figure 9:
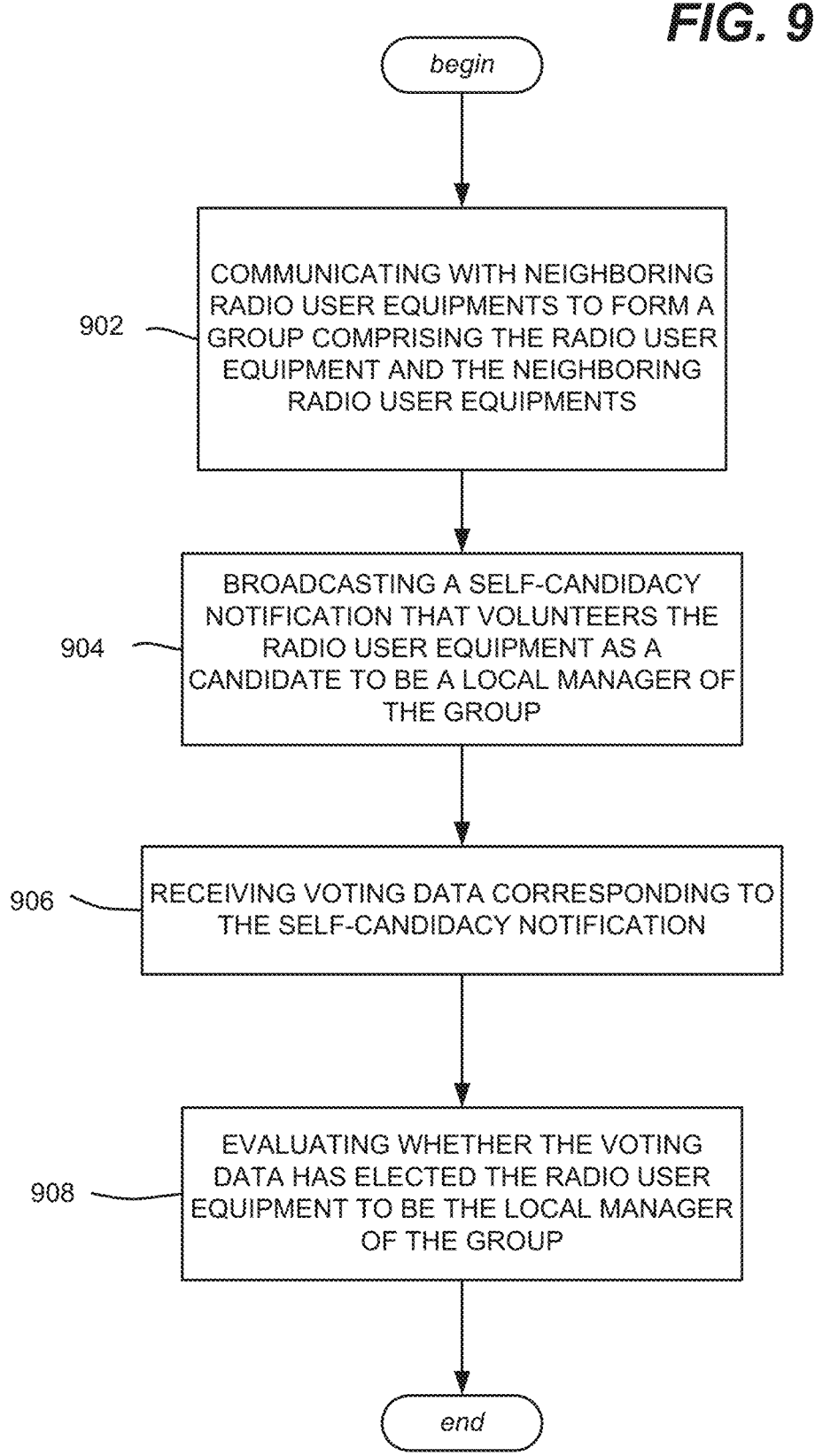
FIG. 9 illustrates an example flow diagram of user equipment operations with respect to determining a local manager of a group, in accordance with various aspects and implementations of the subject disclosure.

FIG. 8 represents general, example operations of a radio user equipment device 102, generally comprising a processor a memory that stores executable instructions that, when executed by the processor, facilitate performance of operations. Example operations can comprise communicating with a neighboring radio user equipment, which has been determined to neighbor the radio user equipment device, to form a group (operation 802), and determining a local manager of the group, the determining comprising communicating voting data within the group between the radio user equipment and the neighboring radio user equipment, and electing the local manager of the group based on the voting data (operation 804).

Determining the local manager of the group can comprise receiving candidate nomination data corresponding to at least two user equipments of the group, and selecting a selected candidate from the at least two user equipments, and communicating the voting data can comprise sending a vote in favor of the selected candidate.

Determining the local manager of the group can comprise broadcasting a self-candidacy notification that volunteers the radio user equipment device as a candidate to be the local manager of the group, evaluating voting data communicated within the group, determining, based on the voting data, that the group elects the radio user equipment device to be the local manager of the group, and operating the radio user equipment device as the local manager for a term, which can comprise relaying information received from the group to a radio network device. The self-candidacy notification can be a first self-candidacy notification, and the operations can comprise, upon expiration of the term, broadcasting a second self-candidacy notification that volunteers the radio user equipment device as the candidate to again be the local manager of the group.

The operations can comprise, within the term, evaluating a metric to determine whether to resign as the local manager prior to expiration of the term. Determining the local manager of the group can comprise evaluating voting data communicated within the group, determining, based on the voting data, that the group elects the first radio user equipment to be the local manager of the group, operating the first radio user equipment as the local manager for a term, which can comprise scheduling radio resources for the second radio user equipment to transmit or receive data, transmitting data to the second radio user equipment, receiving data from the second radio user equipment, transmitting data to a radio network device as a relay and receiving data from a radio network device as a relay, and upon expiration of the term, broadcasting a self-candidacy notification that volunteers the first radio user equipment as a candidate to remain as the local manager of the group.

FIG. 8 represents general, example operations such as corresponding to executable instructions in a machine-readable storage medium, that, when executed by a processor of a radio user equipment, facilitate performance of the operations. The operations can comprise communicating with neighboring radio user equipments to form a group comprising the radio user equipment and the neighboring radio user equipments (operation 902), and broadcasting a self-candidacy notification that volunteers the radio user equipment as a candidate to be a local manager of the group (operation 904). Further operations can comprise receiving voting data corresponding to the self-candidacy notification (operation 906) and evaluating whether the voting data has elected the radio user equipment to be the local manager of the group (operation 908).

Aspects can comprise, receiving a neighbor-candidacy notification that nominates a neighboring radio user equipment of the neighboring radio user equipments as a candidate to be the local manager of the group, and sending, within a time duration, the voting data in response to the receiving the neighbor-candidacy notification.

Evaluating whether the voting data has elected the radio user equipment to be the local manager of the group can comprise comparing a ratio of positive votes of the voting data to negative votes of the voting data with a threshold ratio, and in response to the ratio of the positive votes to the negative votes being determined to exceed the threshold ratio, operating the radio user equipment as the local manager for a term, which can comprise relaying information received from the group to a radio network device relating to the radio user equipment operating as the local manager.

The self-candidacy notification can be first self-candidacy notification, and evaluating whether the voting data has elected the radio user equipment to be the local manager of the group can comprise comparing a ratio of positive votes of the voting data to negative votes of the voting data with a threshold ratio, and in response to the ratio of the positive votes to the negative votes being determined to be below the threshold ratio, refraining from sending a second self-candidacy notification for a period of time.

As can be seen, a user equipment can be autonomously elected by other user equipments in a group to be a local manager, achieving various advantages. Advantages include allowing hardware sharing between a regular cellular network and the V2X or D2D (device-to-device) network. The same node can serve as a relay node for a cellular network as well as a V2X local manager. Further, by having a UE elected to operate as a local manager, the peer-to-peer mesh network is in general converted to a hierarchical architecture, because local manager can schedule resources for UEs that are served by it under a standalone or non-standalone network deployment. The spectral efficiency is much better than that of a fully mesh network, and allows greater network control of licensed spectrum. Still further, the technology described herein allows the introduction of mobile relays with existing infrastructure-based IAB nodes under a common architecture and resource allocation framework. The technology allows spectrum sharing between regular cellular networks and V2X services; the same spectrum band may be reused by V2X service or regular cellular traffic. The technology thus provides for a autonomous spectrum utilization technology.

Figure 10:
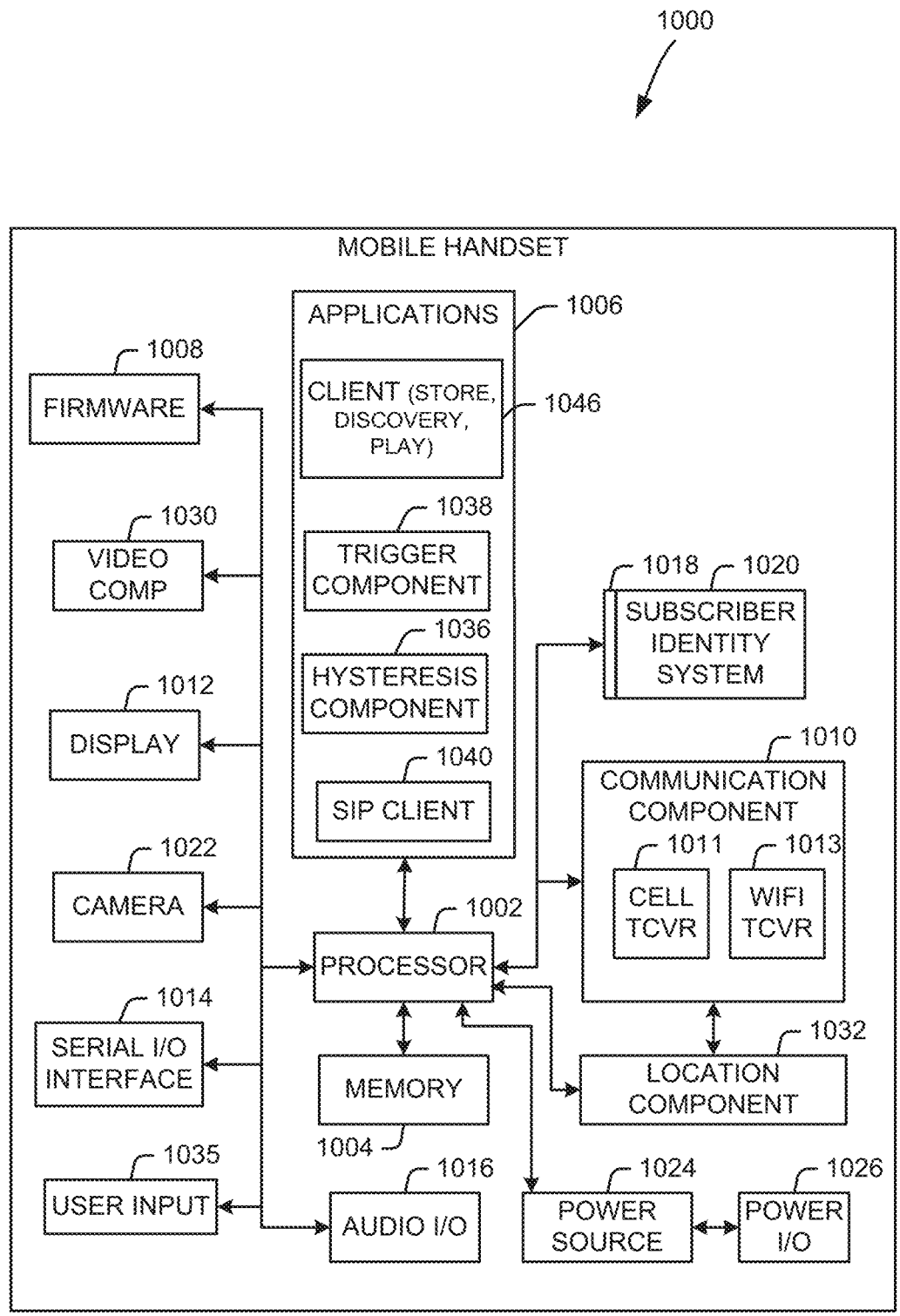
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hard-wire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or a decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
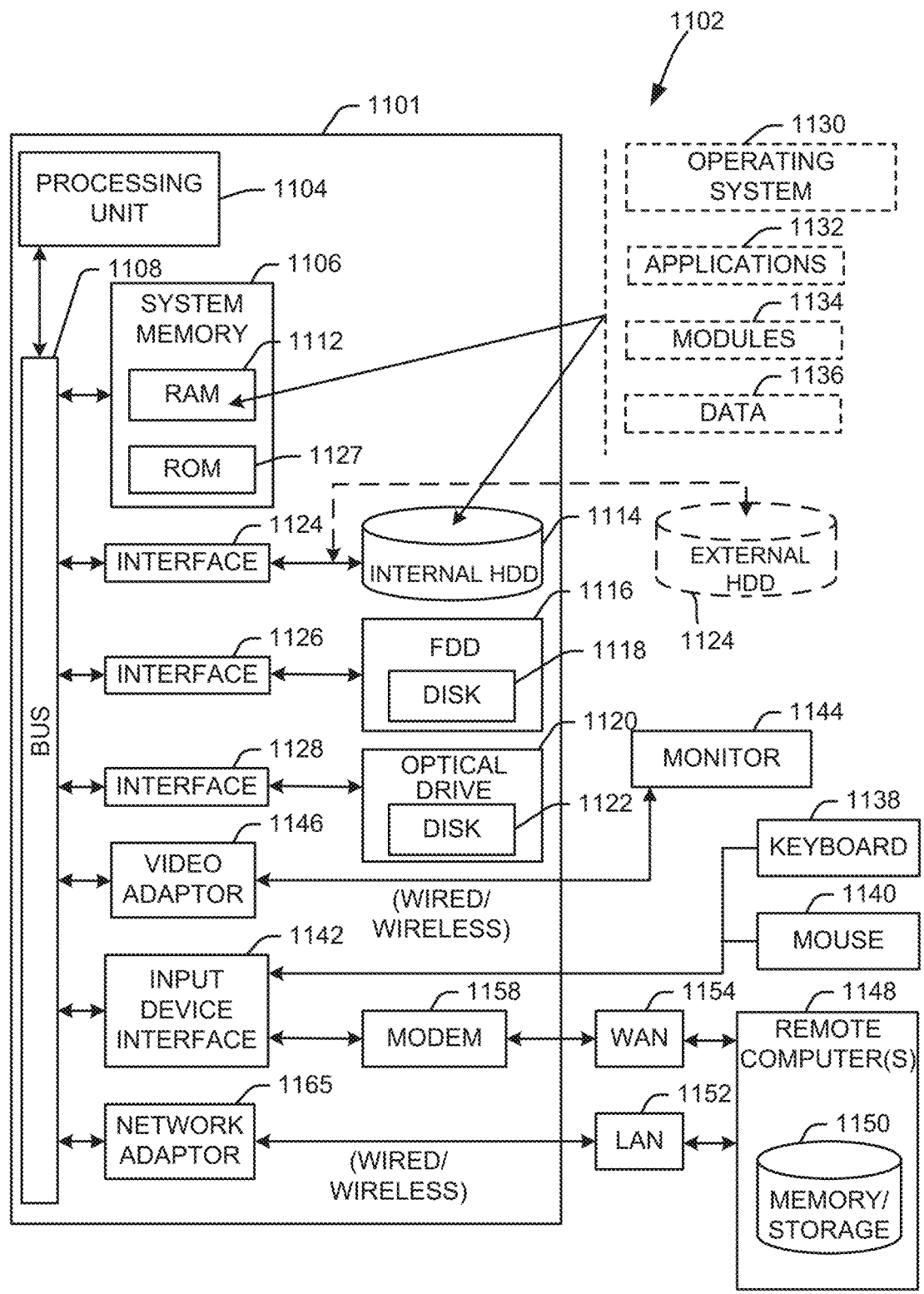
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 11 is but one example of a computing device.

In order to provide a context for the various aspects of the disclosed subject matter, FIG. 11 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, part of the hardware of system 1120, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1394), and Small Computer Systems Interface (SCSI).

System memory 1116 can include volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, a mobile device and/or portable device can include a user interface embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 and a move use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved NodeB (eNodeB) (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. user equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
broadcasting, by a first radio user equipment comprising a processor, first discovery signal data for detection by a second radio user equipment;
discovering, by the first radio user equipment, the second radio user equipment based on second discovery signal data detected from the second radio user equipment;
communicating, by the first radio user equipment, with the second radio user equipment, to form a group; and
determining, by the first radio user equipment, a local manager of the group, the determining comprising communicating within the group, wherein the determining the local manager of the group further comprises receiving a neighbor-candidacy notification that nominates a neighboring radio user equipment of the group as a candidate to be the local manager of the group, and sending, within a time duration, voting data in response to the receiving the neighbor-candidacy notification.

2. The method of claim 1, wherein the sending the voting data comprises sending an acknowledgement or a negative acknowledgement in response to the neighbor-candidacy notification.

3. The method of claim 1, wherein the determining the local manager of the group further comprises receiving at least two neighbor-candidacy notifications within a certain time window that nominate at least two corresponding radio user equipment as candidates to be the local manager of the group, choosing a selected candidate of the candidates of the at least two corresponding radio user equipment based on signal strength information corresponding to the at least two neighbor-candidacy notifications, and sending, within a time duration, the voting data identifying the selected candidate in response to the receiving the at least two neighbor-candidacy notifications.

4. The method of claim 3, wherein the sending the voting data comprises sending, in response to the receiving the at least two neighbor-candidacy notifications, an acknowledgement identifying the selected candidate, and respective negative acknowledgements with respect to other neighbor-candidacy notifications relating to ones of the at least two corresponding radio user equipment other than the selected candidate.

5. The method of claim 1, wherein the communicating within the group comprises broadcasting a self-candidacy notification that volunteers the first radio user equipment as a candidate to be the local manager of the group.

6. The method of claim 5, wherein the determining the local manager of the group further comprises monitoring, within a time duration, second voting data received from the second radio user equipment in response to the broadcasting the self-candidacy notification, determining, based on the second voting data, that the group elects the first radio user equipment to be the local manager of the group, and operating the first radio user equipment as the local manager, comprising relaying information received from the group to a radio network device.

7. The method of claim 1, wherein the determining the local manager of the group further comprises evaluating a plurality of voting data communicated within the group, determining, based on the plurality of voting data, that the group elects the first radio user equipment to be the local manager of the group, operating the first radio user equipment as the local manager for a term, comprising scheduling radio resources for the second radio user equipment to transmit or receive data, transmitting data to the second radio user equipment, receiving data from the second radio user equipment, transmitting data to a radio network device as a relay and receiving data from a radio network device as a relay, and upon expiration of the term, broadcasting a self-candidacy notification that volunteers the first radio user equipment as a candidate to remain as the local manager of the group.

8. The method of claim 1, wherein the determining the local manager of the group comprises broadcasting a neighbor-candidacy notification that requests that a third radio user equipment, which is not the local manager of the group, become a candidate to be the local manager of the group.

9. The method of claim 1, wherein the determining the local manager of the group comprises receiving a neighbor-candidacy notification request that requests that the first radio user equipment become a candidate to be the local manager of the group, evaluating capability data representative of a capability of the first radio user equipment to operate the first radio user equipment as the local manager, and in response to the evaluating, sending decision data representative of whether the neighbor-candidacy notification request has been accepted.

10. A radio user equipment device, comprising:
a processor; and
a memory that stores executable instructions that, when executed by the processor, facilitate performance of operations, the operations comprising:
communicating with a neighboring radio user equipment, which has been determined to neighbor the radio user equipment device, to form a group; and
determining a local manager of the group, the determining comprising:
receiving candidate nomination data corresponding to at least two user equipment of the group,
selecting a selected candidate from the at least two user equipment,
communicating voting data within the group between the radio user equipment and the neighboring radio user equipment, wherein the communicating the voting data comprises sending a vote in favor of the selected candidate, and
electing the local manager of the group based on the voting data.

11. The radio user equipment device of claim 10, wherein the determining the local manager of the group further comprises broadcasting a self-candidacy notification that volunteers the radio user equipment device as a candidate to be the local manager of the group, evaluating voting data communicated within the group, determining, based on the voting data, that the group elects the radio user equipment device to be the local manager of the group, and operating the radio user equipment device as the local manager for a term, comprising relaying information received from the group to a radio network device.

12. The radio user equipment device of claim 11, wherein the self-candidacy notification is a first self-candidacy notification, and wherein the operations further comprise, upon expiration of the term, broadcasting a second self-candidacy notification that volunteers the radio user equipment device as the candidate to again be the local manager of the group.

13. The radio user equipment device of claim 11, wherein the operations further comprise, within the term, evaluating a metric to determine whether to resign as the local manager prior to expiration of the term.

14. The radio user equipment device of claim 10, wherein the determining the local manager of the group further comprises evaluating voting data communicated within the group, determining, based on the voting data, that the group elects a different radio user equipment device other than the radio equipment device to be the local manager of the group, and communicating with the local manager of the group to relay information from the radio user equipment device to a radio network device relating to the different radio user equipment device.

15. A machine-readable storage medium, comprising executable instructions that, when executed by a processor of a radio user equipment, facilitate performance of operations, the operations comprising:
communicating with at least one neighboring radio user equipment to form a group comprising the radio user equipment and the at least one neighboring radio user equipment;
broadcasting a self-candidacy notification that volunteers the radio user equipment as a candidate to be a local manager of the group;
receiving voting data corresponding to the self-candidacy notification; and
evaluating whether the voting data has elected the radio user equipment to be the local manager of the group, wherein the evaluating whether the voting data has elected the radio user equipment to be the local manager of the group comprises receiving a neighbor-candidacy notification that nominates a neighboring radio user equipment of the group as a candidate to be the local manager of the group, and sending, within a time duration, voting data in response to the receiving the neighbor-candidacy notification.

16. The machine-readable storage medium of claim 15, wherein the evaluating whether the voting data has elected the radio user equipment to be the local manager of the group further comprises comparing a ratio of positive votes of the voting data to negative votes of the voting data with a threshold ratio, and in response to the ratio of the positive votes to the negative votes being determined to exceed the threshold ratio, operating the radio user equipment as the local manager for a term, comprising relaying information received from the group to a radio network device relating to the radio user equipment operating as the local manager.

17. The machine-readable storage medium of claim 15, wherein the self-candidacy notification is first self-candidacy notification, and wherein the evaluating whether the voting data has elected the radio user equipment to be the local manager of the group further comprises comparing a ratio of positive votes of the voting data to negative votes of the voting data with a threshold ratio, and in response to the ratio of the positive votes to the negative votes being determined to be below the threshold ratio, refraining from sending a second self-candidacy notification for a period of time.

18. The machine-readable storage medium of claim 15, wherein the self-candidacy notification is a first self-candidacy notification, and wherein the operations further comprise, upon expiration of the term, broadcasting a second self-candidacy notification that volunteers the radio user equipment device as the candidate to again be the local manager of the group.

19. The machine-readable storage medium of claim 15, wherein the operations further comprise, within the term, evaluating a metric to determine whether to resign as the local manager prior to expiration of the term.

20. The method of claim 6, wherein the operating the first radio user equipment as the local manager comprises operating the first radio user equipment as the local manager for a term.

* * * * *